July 19, 1927. 1,636,513
J. D. E. HUGHES
AUTOMOBILE THEFT DETECTOR
Filed Sept. 18, 1923   2 Sheets-Sheet 1

Inventor
Joseph D. E. Hughes
By Attorneys
Cooper, Kerr & Dunham

July 19, 1927.
J. D. E. HUGHES
1,636,513
AUTOMOBILE THEFT DETECTOR
Filed Sept. 18, 1923      2 Sheets-Sheet 2
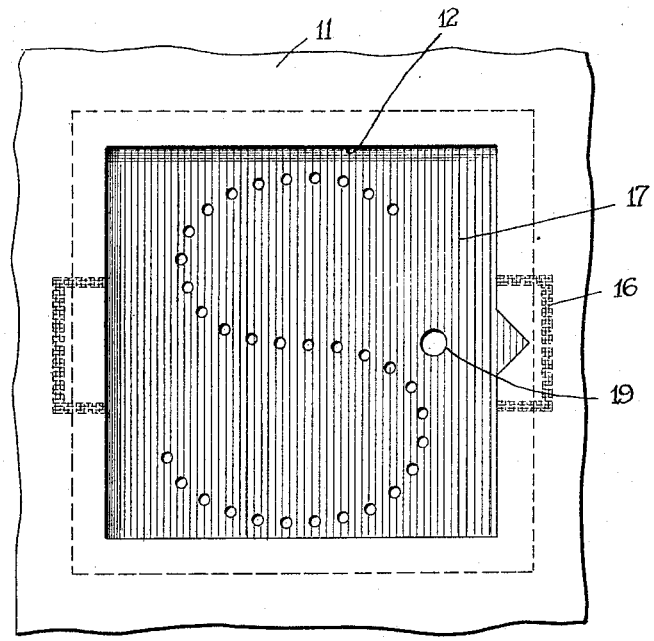
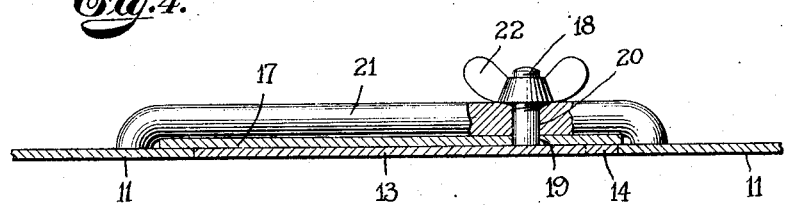
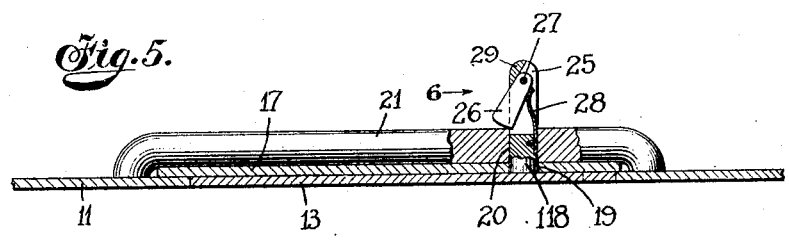
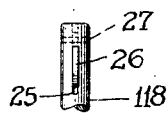

Patented July 19, 1927.

1,636,513

UNITED STATES PATENT OFFICE.

JOSEPH D. E. HUGHES, OF NEW YORK, N. Y., ASSIGNOR TO STOTESBURY & MINER, OF NEW YORK, N. Y., A FIRM COMPOSED OF LOUIS W. STOTESBURY AND JUSTIN L. MINER, COPARTNERS.

AUTOMOBILE THEFT DETECTOR.

Application filed September 18, 1923. Serial No. 663,351.

This invention relates to automobiles. More specifically it relates to methods and means for indicating and detecting theft or unauthorized use of automobiles and has for one of its objects to provide novel methods and means for the above mentioned purpose.

Another object is to provide methods and means as above set forth which are comparatively easy to carry into practice.

A further object is to provide methods and means for indicating and detecting the theft or unauthorized use of automobiles which do not detract from the attractive appearance of the automobiles to which the invention is applied. Further objects and advantages will appear as the invention is hereinafter disclosed.

The method or methods may best be explained by describing what I now consider preferred forms of instrumentalities for carrying them into practice, these now preferred instrumentalities being shown in the drawings in which:

Fig. 3 is a view similar to Fig. 2 but with the removable portion removed.

Fig. 4 is a horizontal fragmentary sectional view, the section being taken on the line 4—4 of Fig. 2.

Fig. 5 is a view similar to Fig. 4 but illustrating a modification.

Fig. 6 is a fragmentary detail elevation looking in the direction of the arrow 6 in Fig. 5.

Figure 1:
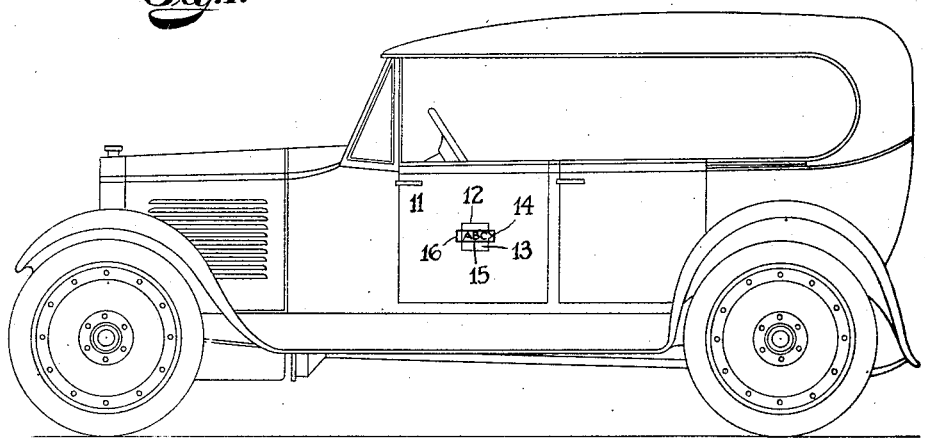
Fig. 1 is a side elevation of an automobile with one form of my invention applied thereto.

The automobile shown in Fig. 1 has a body 10 whose outer portion 11 consists of sheet metal, such as aluminum or steel, commonly used in automobile body construction. A permanent part of the body portion 11, preferably that part forming the outside of the left hand side door adjacent the driver's position, is provided with a recess 12 adapted to receive a removable plate or part 13 of such shape or outline as to fit the recess 12 closely and preferably so that its outer surface will lie flush with the outer surface of the part 11. The shape or outline of the recess 12 and its removable mating portion 13 are such that the removable part 13 of any automobile will fit or register with the recess 12 of that car but not other cars. Various shapes or outlines of recesses and parts 13 may be employed to this end. Thus the plates or parts 13 of one particular type or make of automobiles may be generally rectangular in outline, as shown in the drawings, and provided with a projection, such as that indicated at 14, peculiarly or distinctively located with respect to the rectangular portion for each particular car of that type or make.

The recess 12 and mating part 13 may be conveniently manufactured as follows. The part 13 is stamped out of the sheet material 11 by means of an adjustable die (not shown), the projection of the die which forms the projection 14 being shifted after each operation so that a large number of recesses 12 and mating parts may be stamped out with the same die, nevertheless providing a distinctive recess 12 and part 13 for each car. It will of course be appreciated that other or additional dies may be employed, if desired, to increase the total number of distinctive recesses and corresponding parts 13. To illustrate in further detail the above outlined manufacture of the recesses 12 and corresponding parts 13, I have shown the outline of the part 13 of one particular automobile in full lines in Fig. 2. This part 13 is adapted to fit or register with the recess 12 of that one particular body portion 11 but not with the recess 12 of other automobiles. After that particular recess 12 and part 13 is stamped the projection of the die would be shifted (preferably automatically) so that the projection 14 of the next recess 12 and part 13, when stamped, would occupy a different position, with respect to the rectangular portion of the recess 12 and part 13. The projection of the die would again be shifted and so on. Thus the part 13 of any car cannot be applied to the recess 12 of other cars since it will not fit or register therewith.

In addition to the mechanical fit or registration of the parts 13 and 11, as above described, I prefer to paint or finish the outer surfaces of the said parts 13 and 11 in such manner that they will present the same appearance. This is accomplished by inserting the removable part 13 in flush position with respect to the body portion before the paint or varnish is applied, then painting or varnishing the outer surfaces of the parts 11 and 13 as one continuous surface, and removing the part 13 immediately after each coat of paint or varnish has been applied allowing it to dry separately. In this way the desired fit or registration may be secured without in any way effacing the finish of the machine or detracting from its appearance. This method of finishing accomplishes another desirable object in that it renders undetectable duplication of the portion 13 of any car even more difficult, especially after the particular automobile has been in use and the surface of its body portion 11 exposed to the weather and elements. To render such duplication even more difficult, the outer surface of the removable part 13 of each car may be provided with a stripe or stripes 15, of a color (say, yellow) different from the color (say, blue) of the outer surface of the body portion 11, and adapted to register with a stripe or stripes 16, of color similar to that of the stripe or stripes 15. The stripes 15, 16 may form a more or less ornamental and distinctive design such as a border shown in Fig. 2. If desirable, the design may be such that the stripes 15 of the part 13 of each automobile will register or align with the stripes 16 of the body portion 11 of that car but not with the stripes 16 of other cars. To enhance the attractive appearance of the device the owner's initials may be painted or otherwise depicted upon the outer surface of the part 13, as indicated at ABC in Fig. 2.

Means are provided for indicating the removal or absence of the part or portion 13. While other forms of indicating means may be employed a simple and effective form of such means may be constructed substantially as follows. A plate 17, of sheet metal or other suitable material, is soldered, brazed, riveted or otherwise suitably secured to the back or inner side of the body portion 11 so as to cover the back of the recess 12. The outer surface of the plate 17 is painted, enameled, or otherwise colored, with a color which contrasts sharply with the color of the body portion 11. I prefer to color the plate 17 red unless that happens to be the color of the body portion 11, in which event some contrasting color would be selected for the plate 17. If desirable, the plate 17 may be perforated to form a signal or indication such as the letter "S" (indicating stolen) as shown in Fig. 3.

Figure 2:
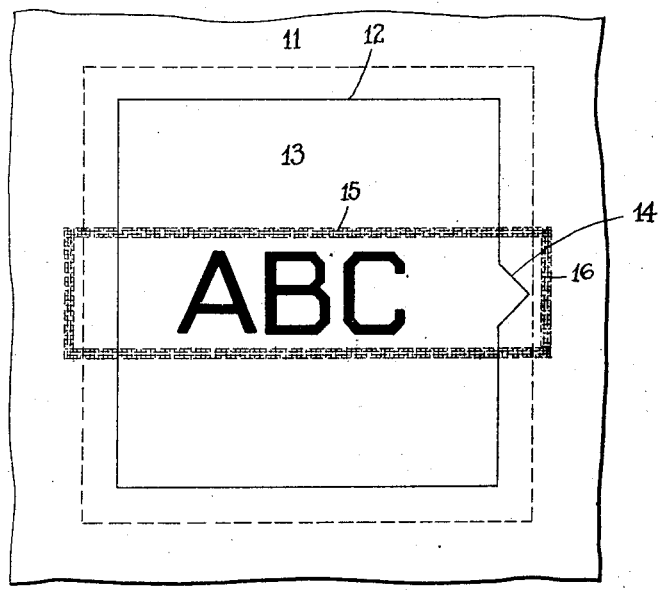
Fig. 2 is an enlarged view illustrating the form of invention shown in Fig. 1.

Among other forms of mechanism for removably supporting the part 13 in the position shown in Fig. 2, the instrumentalities shown in Figs. 3 and 4 may be employed. The plate or part 13 has soldered, brazed, welded, or otherwise rigidly secured thereto at its rear surface, a stud or bolt 18 adapted to pass though a hole 19, provided in the plate 17, and through a hole 20, provided in a cylindrical rod 21 suitably secured at its opposite ends to the body portion 11. The bolt or stud 18 is shown provided with a removable wing nut 22 and the design and location of parts are such that the wing nut 22 is accessible for manipulation by the driver or operator of the automobile to remove it from and restore it to its position indicated in Fig. 4. As stated above, the portion 13 and recess 12 are preferably provided on the left hand side door of the automobile. A convenient location is such that the wing nut 22 may be reached for manipulation through the flap or door of the pocket commonly provided in the side door, although other provisions for access to the nut 22 may be adopted. If desirable, the rod 21 may be dispensed with and the wing nut 22 caused to engage the back of the plate 17 to hold the part 13 in position.

In describing my invention I have pointed out that the part 13 is adapted to fit or register with the recess 12 of its corresponding, particular automobile but not other automobiles. This distinctive registration may be secured or insured by other means. Thus the stud 18 and holes 19 and 20 may be differently located with respect to the part 13 and recess 12 in different automobiles. The holes 19, 20 of any particular automobile would of course align with each other and with the stud 18 of the particular automobile when the parts are in the position shown in Figs. 2 and 4, but when a part 13 fitting the recess 12 is mounted therein the stud 18 will enter the holes 19 and 20 of that particular automobile but would not enter the openings 19 and 20, or either of them, of other automobiles.

By virtue of the change of relative position of the projection 14 for different part 13 or the variation of the relative position of the stud 18 and openings 19 and 20, or both of these features, an enormous number of non-interchangeable removable portions may be obtained.

The operation of the particular device illustrated in Figs. 1 to 4 is as follows. When an automobile equipped with the invention is occupied by the owner or a person or persons authorized by him, the parts would occupy the relative position shown in Figs. 1, 2 and 4, and the appearance would be as shown in Fig. 1 and in full lines in Fig. 2. On leaving the automobile the owner or authorized operator would unscrew the nut 22, remove the part 13 and carry the latter (which is preferably of such size and weight as to be capable of being carried in the pocket of the user's coat or other garment) with him. If a thief should now steal the automobile the red signal 17 would apprise traffic officers and others that the automobile had been stolen or was being used without authority from the owner. To cover the signal 17 with a coat, garment or other screen would immediately arouse suspicion and lead to detection of the theft or unauthorized use of the automobile. As a practical proposition it would be impossible for a thief or unauthorized user to duplicate the removable portion 13 of any automobile within the time available to him because of the distinctive characteristics, or combination of the same, of each particular one of the great varieties of parts 13. The distinctive characteristics above described may be summarized as follows: Each member 13 has a distinctive shape or outline, it bears the same finish as the surrounding body portion, it bears distinctive stripes of color, it bears the owner's initials, and it is provided with a distinctively located stud 18. In addition, the insurance companies or other authorities may require the users of the invention to attach the license card, issued by the State where the automobile is owned, permanently to the back of the removable part 13. It will be appreciated, of course, that either all, or as many as are desired, of these distinctive characteristics may be employed without departing from the scope of the invention as defined by the appended claims. If any part of the red field 17 is visible or any of the other distinctive characteristics absent, suspicion would be aroused and detection of theft or unauthorized use of the automobile would naturally follow.

Besides those above noted, the form of invention disclosed is susceptible to modification in various respects. For example, instead of employing the fastening means shown in Fig. 4, the mechanism shown in Figs. 5 and 6 may be employed. Referring to the last mentioned figures, the elements 11, 13, 14, 17, 19, 20 and 21 will immediately be recognized. The stud 19 and nut 22 are, however, not employed but in their place the following elements are utilized. A post 118, secured to the back of the part 13 and adapted to enter holes 19 and 20, is provided with a slot 25 in which a catch 26 is pivotally mounted at 27. The catch 26 is movable from the position indicated in full lines in Fig. 5 to a position entirely within the confines of stud 118, and vice versa. The catch is biased or urged to the outer position by means of a leaf spring 28 mounted in the slot 25 and secured at its lower end to the stud 118. The outward movement of the catch 26, under the impelling action of the spring 28, is limited to the position shown in Fig. 5 by engagement with the portion 29 of the stud 118. When the parts occupy the position shown in Fig. 5, inadvertent removal, and removal of the member 13 from the outside of the automobile, are prevented by the cooperation of the catch 26 and rod 21. To remove the member 13, the catch 26 is manually moved to a position within the confines of the stud 118. The latter may now be drawn through the holes 19 and 20 and the member 13, together with the stud 118, entirely detached from the automobile. To reinsert the part 13 in its recess 12, the stud 118 is inserted through the holes 19 and 20 until the catch is automatically snapped to the position shown in Fig. 5. Otherwise the construction and operation of the form of invention shown in Figs. 5 and 6 are the same as that of the preceding figures.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use.

What I claim is—

1. A system of identifying and guarding against theft of motor cars which comprises providing each car with a removable portion adapted to register at its marginal edge with a permanent portion of the body of that particular car but not other cars and adapted to be removed by the authorized driver of the particular car when he leaves the car, and indicating the absence of each such removable portion to persons not occupying the car upon which the removable portion is missing.

2. An automobile having a removable portion adapted to register at its marginal edge with a permanent portion of the body of that automobile but not other automobiles, and means for indicating the absence of the removable portion to persons not occupying the automobile.

3. A device for identifying ownership of a car comprising a removable portion of the car body, such portion being of distinctive characteristics and adapted to fit in a recess whose back is painted in a color contrasting with that of the body of the car.

4. The combination with an automobile of means for indicating unauthorized use thereof, said means comprising a portable removable portion of the automobile body, such portion being adapted to fit in a recess in the car body with its outer surface flush with and forming a continuation of the outer surface of the automobile, the said two surfaces being finished with corresponding material, and the back of said recess being coated with a color contrasting with that of the body of the car.

5. A device for identifying ownership of a car, comprising a removable portion of the car body of distinctive individual pattern, so that the part of the car cannot be restored or the absence of the removable portion concealed by the substitution of any other than the particular portion removed.

In testimony whereof I hereto affix my signature.

JOSEPH D. E. HUGHES.